(12) United States Patent
Shtof et al.

(10) Patent No.: US 12,518,185 B2
(45) Date of Patent: Jan. 6, 2026

(54) CONTENT RECOMMENDATION BASED UPON CONTINUITY AND GROUPING INFORMATION OF ATTRIBUTES

(71) Applicant: Yahoo Assets LLC, New York, NY (US)

(72) Inventors: Alexander Shtof, Haifa (IL); Yair Koren, Haifa (IL); Yohay Kaplan, Tel-Aviv (IL)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 18/674,532

(22) Filed: May 24, 2024

(65) Prior Publication Data

US 2024/0311662 A1 Sep. 19, 2024

Related U.S. Application Data

(63) Continuation of application No. 18/097,424, filed on Jan. 16, 2023, now Pat. No. 11,995,572, which is a continuation of application No. 16/800,504, filed on Feb. 25, 2020, now Pat. No. 11,556,814.

(51) Int. Cl.
| | |
|---|---|
| *G06F 7/00* | (2006.01) |
| *G06F 16/23* | (2019.01) |
| *G06F 16/2457* | (2019.01) |
| *G06F 17/00* | (2019.01) |
| *G06N 5/02* | (2023.01) |
| *G06N 5/04* | (2023.01) |

(Continued)

(52) U.S. Cl.
CPC ............... *G06N 5/04* (2013.01); *G06F 16/23* (2019.01); *G06F 16/24578* (2019.01); *G06N 5/02* (2013.01); *G06N 20/00* (2019.01); *G06Q 30/0201* (2013.01)

(58) Field of Classification Search
CPC . G06N 5/04; G06N 20/00; G06N 5/02; G06F 16/23; G06F 16/24578; G06Q 30/0201
USPC ............................................................ 706/11
See application file for complete search history.

(56) References Cited

U.S. PATENT DOCUMENTS

| | | | | |
|---|---|---|---|---|
| 7,739,607 B2 * | 6/2010 | Abbott | ................... | G06N 20/00 706/45 |
| 8,346,724 B2 * | 1/2013 | Abbott | ................... | G06F 3/011 707/648 |
| 9,430,570 B2 * | 8/2016 | Button | ................... | G06N 5/022 |

(Continued)

*Primary Examiner* — Pavan Mamillapalli
(74) *Attorney, Agent, or Firm* — Cooper Legal Group LLC

(57) ABSTRACT

One or more computing devices, systems, and/or methods for content recommendation based upon continuity and grouping information of attributes are provided herein. User interaction data specifying whether users interacted with content items, user attributes of the users, and content attributes of the content items is obtained. A data structure is populated with the user interaction data. The data structure is modified by inserting a set of sub-fields into the data structure for a user attribute. A sub-field is populated with a value representing an option of the user attribute. The set of sub-fields are an encoding of continuity information and grouping information representing options for the user attribute. The data structure is processed using machine learning functionality to generate a model. The model is utilized to generate a prediction as to whether a user will interact with a content item.

20 Claims, 9 Drawing Sheets

(51) Int. Cl.
*G06N 20/00* (2019.01)
*G06Q 30/0201* (2023.01)

(56) References Cited

U.S. PATENT DOCUMENTS

| | | | |
|---|---|---|---|
| 11,556,814 B2* | 1/2023 | Shtof | G06N 5/02 |
| 2002/0107852 A1* | 8/2002 | Oblinger | G06F 16/337 |
| | | | 707/999.005 |
| 2009/0012841 A1* | 1/2009 | Saft | G06Q 30/02 |
| | | | 705/7.29 |
| 2012/0102050 A1* | 4/2012 | Button | G06N 5/022 |
| | | | 707/E17.014 |
| 2013/0073390 A1* | 3/2013 | Konig | H04L 67/306 |
| | | | 705/14.54 |
| 2013/0325897 A1* | 12/2013 | Motgi | G06F 16/3322 |
| | | | 707/E17.014 |
| 2014/0079195 A1* | 3/2014 | Srivastava | G10L 15/22 |
| | | | 379/88.01 |
| 2014/0207518 A1* | 7/2014 | Kannan | G06F 16/958 |
| | | | 705/7.29 |
| 2015/0058336 A1* | 2/2015 | Davis | G06F 16/248 |
| | | | 707/732 |
| 2017/0061286 A1* | 3/2017 | Kumar | G06Q 30/0269 |
| 2018/0240152 A1* | 8/2018 | Mookherjee | G06F 16/951 |

* cited by examiner

CONTENT RECOMMENDATION BASED UPON CONTINUITY AND GROUPING INFORMATION OF ATTRIBUTES

RELATED APPLICATIONS

This application claims priority to and is a continuation of U.S. application Ser. No. 18/097,424, filed on Jan. 16, 2023, entitled "CONTENT RECOMMENDATION BASED UPON CONTINUITY AND GROUPING INFORMATION OF ATTRIBUTES", which claims priority to and is a continuation of U.S. application Ser. No. 16/800,504, filed on Feb. 25, 2020, entitled "CONTENT RECOMMENDATION BASED UPON CONTINUITY AND GROUPING INFORMATION OF ATTRIBUTES". U.S. application Ser. No. 18/097,424 and U.S. application Ser. No. 16/800,504 are both incorporated by reference herein in their entirety.

BACKGROUND

A content recommendation system may be configured to provide content items to users. For example, a content item may be provided to a client computing device of a user, such as a mobile device (e.g., an image displayed on a webpage accessed by a browser of the mobile device), a wearable device (e.g., a push notification through a smart watch), a smart device (e.g., a recommendation of a movie to watch through a video streaming service accessed by a smart television), or other computing devices. The content recommendation system may recommend various types of content items, such as videos to watch, images to view, items to purchase (e.g., a recommendation to purchase a vehicle), services to purchase (e.g., a recommendation to have a furnace cleaned), a restaurant recommendation, songs to listen to, etc.

The content recommendation system may utilize machine learning functionality and/or a model to predict likelihoods that a particular user will interact with content items. Once trained by the machine learning functionality, the model outputs predictions of how likely the user is to interact with content items based upon content attributes of the content items and user attributes of the user. Unfortunately, typical machine learning mechanisms which are used for content recommendation require that user attributes and content attributes must be limited to a discrete and finite set of attribute values. Despite this limitation, these mechanisms tend to be effective. For example, time must be represented by a discrete finite set of values (e.g., 0, 1, 2, . . . , 23). The content recommendation system is limited to individually taking into account individual attribute hours and how each individual attribute hour will affect the probability of the user interacting with content items. As a consequence, such content recommendation systems cannot account for similar user behavior at nearby times (e.g., a user may have similar behavior at 2:00 am and 3:00 am or at 7:00 pm and 8:00 pm, but the content recommendation system can only take into account the effects that a single isolated hour has on user behavior). This significantly reduces the precision and accuracy of outputting accurate predictions of how user attributes and content attributes affect the probability of users interacting with content items.

SUMMARY

In accordance with the present disclosure, one or more computing devices and/or methods for content recommendation based upon continuity and grouping information of attributes are provided. Machine learning functionality may be utilized to train and generate a model based upon user interaction data, such as past/historic user interaction data. The user interaction data may specify whether users interacted with content items (e.g., did a user watch a video provided as a suggestion by a video streaming service or not, did a user click on a recommendation to purchase an item or not, did a user purchase a recommended service or not, etc.). The user interaction data may specify user attributes of the users that either did or did not interact with the content items after being provided with an opportunity to interact with the content items. The user attributes may correspond to an age of a user, a location of a user, a time at which a user performed an action such as logging into the video streaming service, a current location of the user, a home location of the user, demographic information about the user, interests of the user (e.g., the user is interested in playing videogames), and/or a wide variety of information about the user, activities of the user, preferences of the user, etc. The user interaction data may specify content attributes of the content items that were identified as either being interacted with or not by particular users. The content attributes may correspond to a content identifier, a content topic/category (e.g., cars, romance movies, pop music, clothing for sale, sports, etc.), a type of content (e.g., movie, image, hyperlink to a website, audio message, text, etc.), when the content was generated, an author of the content, and/or a variety of other attributes of content items.

The machine learning functionality and/or the model, such as a factorization machine, may natively expect to receive attributes as discrete values of a finite set (e.g., age represented by discrete years of 1 years old, 2 years old, 3 years old, etc. of a finite set of ages from 1 year old to 101 years old). This does not take into account continuity of values in the real world (e.g., time/age is a continuous concept in the real world as opposed to discrete isolated individual values), and thus the model cannot understand and take into account similarities in user behavior across multiple values such as where a 32 year old may have similar behavior as a 33 year old. Accordingly, as provided herein, continuity information and grouping information are encoded into data, such as a data structure, used to train and execute the model. The data structure, such as a table or any other structure capable of storing data, may be populated with the user interaction data. For a particular user attribute (e.g., ages of users), user attributes values of the user attribute are populated within a first set of fields (e.g., an age column populated with ages of users). For a particular content attribute (e.g., categories of content items), content attribute values of the content attribute are populated within a second set of fields (e.g., a category column populated with categories of content items). User interaction indicator values are populated within a third set of fields (e.g., a third column of whether a user provided with a content item interacted with the content item or did not interact with the content item).

In order to encode the continuity information and the grouping information into the data structure, the data structure is modified by inserting a set of sub-fields into the data structure for an attribute (e.g., a set of columns for a user attribute or a content attribute). The set of sub-fields are an encoding of continuity information and grouping information representing options (sub-categories) for the attribute. For example, a sub-field of an attribute value is populated with a value (e.g., a "1" or a "0") indicating whether the attribute value corresponds to an option (sub-category) of the attribute represented by the sub-field. In an example, the set of sub-fields are populated with gray code information corresponding to options (sub-categories) of the attribute. For example, a first age value may be represented by a gray code of 3 digits 000, a second age value may be represented by a gray code of 3 digits 001, a third age value may be represented by a gray code of 3 digits 011, etc. The first digit corresponds to a first option of an age attribute, the second digit corresponds to a second option of the age attribute, and the third digit corresponds to a third option of the age attribute.

The gray code information may be monotonic (e.g., a last gray code value can significantly differ from a first gray code value) or cyclic (e.g., a last gray code value differs from a first gray code value by merely 1 digit). In an example, each consecutive gray code value differs by a single digit (e.g., 000 differs from 001 by the third digit, 001 differs by 011 by the second digit, etc.). Each digit of the gray code information adds additional information about an attribute value of an attribute such as whether the attribute value corresponds to an option (sub-category) of the attribute or not, and thus the gray code information can be used to train to model to take into account continuity and groupings of similar attribute values (e.g., attribute values that correspond to similar options). Because of the continuity of gray codes (e.g., each consecutive number differs only in 1 digit), two consecutive gray codes may correspond to almost the same options (sub-categories) except for one option (the 1 differing digit) that differentiates them. This information may be used by the model to understand and correlate together user behavior of users that have similar attributes (e.g., users that are 32 years old and 33 years old may behave similarly). In this way, the model can learn an explicit representation which contains information about interactions of users and items that are grouped together (e.g., each consecutive gray code will merely differ by a single digit, and other digits will be the same and thus part of the same/similar groups/options).

After encoding of the continuity information and grouping information, the data structure is processed using machine learning functionality to generate a model. The model is significantly more accurate because it is additionally trained to take into account multiple options (subgroups) for a single attribute value based upon the continuity information and grouping information (e.g., instead of merely accounting for a single value of age 30, the model takes into account additional options encoded by using multiple digits of gray code information such as 3 digits of a 3 digit grey code used to represent different options of age that the age of 30 could correspond to or not). In this way, the model may be utilized to more accurately and precisely predict likelihoods of whether a user will interaction with various content items. Accordingly, content items can be ranked based upon how likely the user will interact with each content item, and a particular content item (e.g., a highest ranked content item) can be recommended and/or provided to the user, such as transmitted over a network to a client computing device for display to the user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
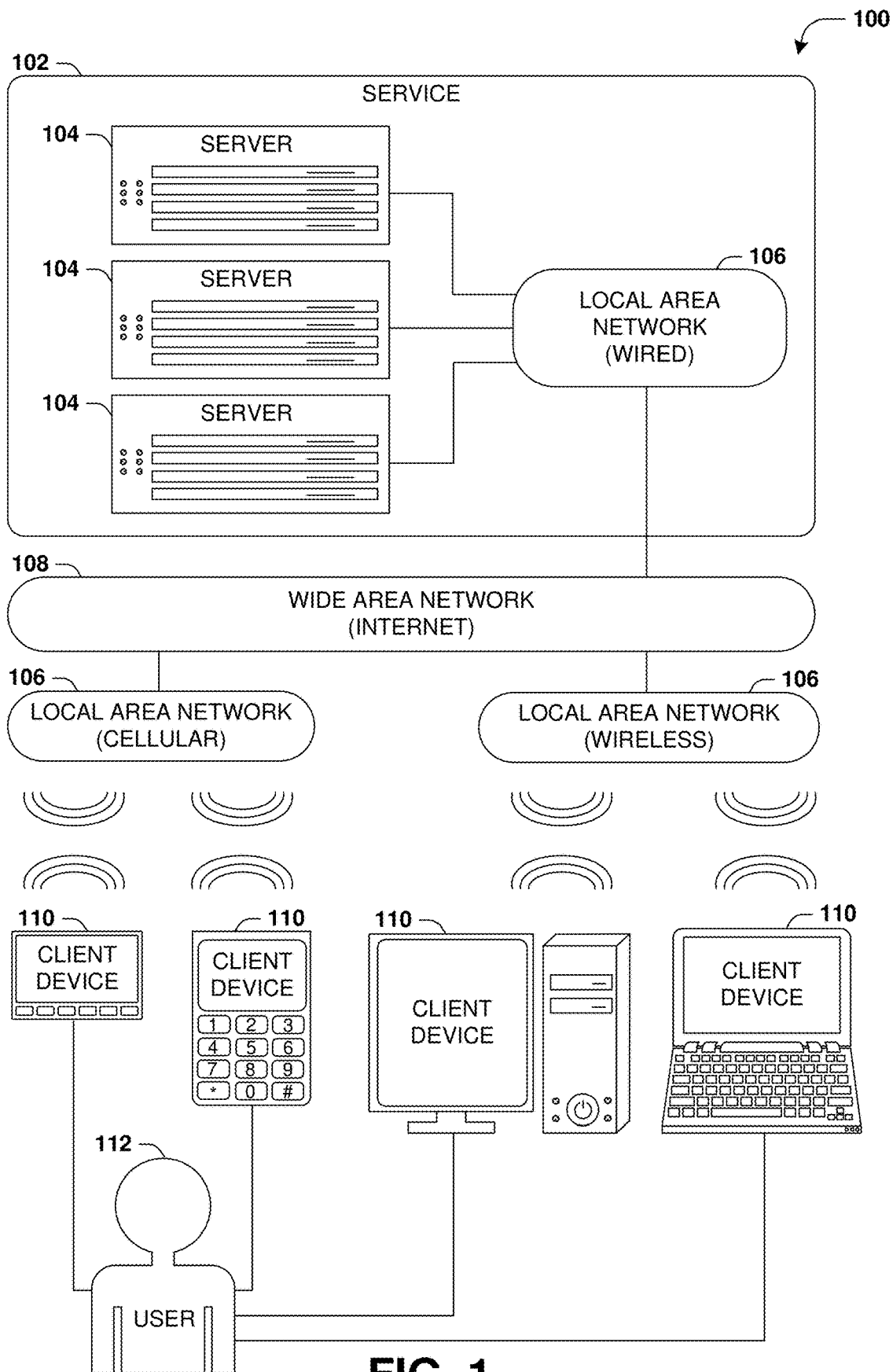
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
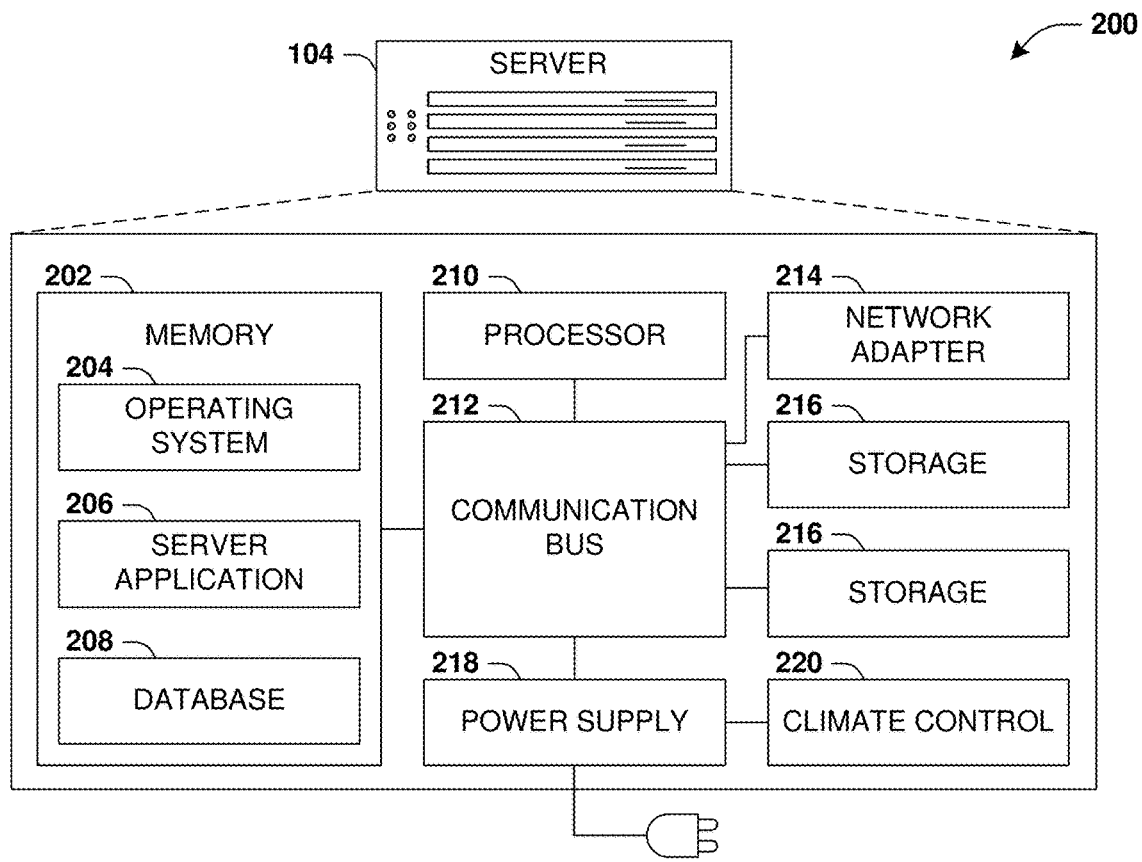
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
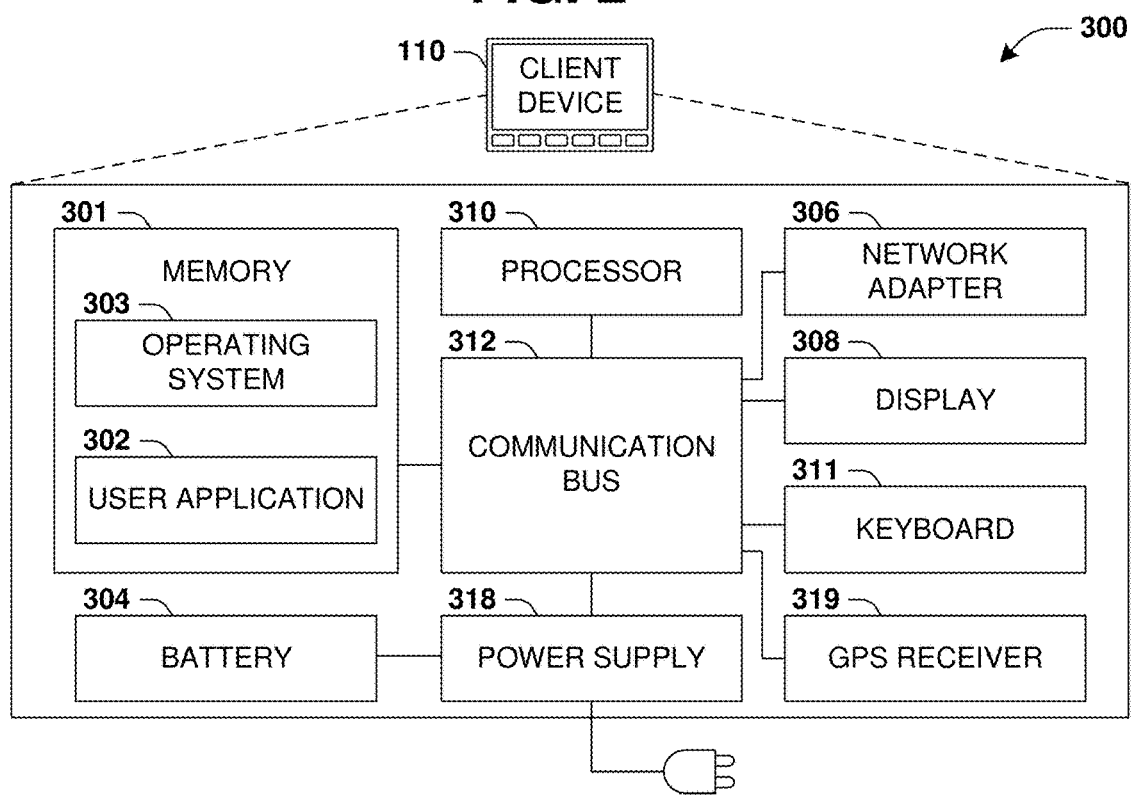
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

Techniques are provided for content recommendation based upon continuity and grouping information of attributes. A content recommendation system may be implemented as software and/or hardware by one or more computing devices, such as a server. The content recommendation system may be configured to provide content items over a network to computing devices connected to the content recommendation system (e.g., a mobile device, a computer, a wearable device, a smart device, or other client device connected to the server over the network). A content item may comprise text, an image, a movie, a song, a video, an article, a website, a hyperlink to a website, a description or recommendation of a physical item (e.g., a shirt, a car, an item for purchase, etc.) or service (e.g., a chiropractic service, an oil change service, a service for purchase, etc.). A content item may be provided through various applications, services (e.g., a recommendation of a video available through a video streaming service, a recommendation of a song available through an audio streaming service, a recommendation of a videogame to play through a videogame service, etc.), user interfaces, websites (e.g., an image or video displayed through a webpage), notifications (e.g., a push notification to a mobile device, a text message, an email, etc.), etc.

Different users have different interests and there may be hundreds of thousands of different types of content items available to provide to users. Accordingly, the content recommendation system may utilize machine learning functionality and/or a model to predict how likely certain users are to interact with certain content items. In this way, when an opportunity arises to provide a content item to a user (e.g., a user visits a website or accesses a user interface through which a content item may be displayed), available content items may be ranked in terms of how likely that user will interact with each content item. A highest ranked content item may then be provided to the user.

In order to output predictions of how likely the user is to interact with content items, the content recommendation system executes the model upon user attributes of the user and content attributes of the content items. The user attributes may correspond to an age of a user, interests of a user, a time at which a user performed an action such as checking email in the morning, a current location of the user, a home location of the user, demographic information about the user, and/or a wide variety of information about the user, activities of the user, preferences of the user, etc. The content attributes may correspond to a content identifier, a content topic/category (e.g., food, shopping, clothing, videogames, etc.), a type of content (e.g., movie, image, hyperlink to a website, etc.), and/or a variety of other attributes of content items. The model may process the user attributes and the content attributes in order to output the predictions of how likely the user is to interact with content items.

The model and/or the machine learning functionality of the content recommendation system, such as a factorization machine, may expect attributes to have discrete values within a finite set. In an example, instead of representing time as a continuous temporal representation as time exists in the real world, the model may expect and merely support a representation of time as a finite set of discrete hours from 0 to 23 or discrete groupings of multiple hours such as groupings of 3 hours where group 1 represents hours 0 to 2:30 am, group 2 represents hours 3:00 am to 5:59 am, etc. In another example, instead of representing age as a continuous age spectrum, the model may expect and merely support a representation of age as a finite set of discrete yearly ages, such as 1 years old, 2 years old, 3 years old, etc. Accordingly, the model cannot take into account or interpret continuity of attribute values, such as how time and age are continuous in the real world. Thus, the model cannot take into account valuable information regarding similarity of user behavior outside the isolated individual discrete values of a finite set (e.g., the model cannot take into account the notion that users may behave similarly at ages 30 through 32). This inability to take into account additional information otherwise conveyed by continuity information and group information greatly reduces the accuracy and precision of the model to accurately predict how likely the user is to interact with content items. Inaccurate predictions will result in the content recommendation system providing inaccurate recommendations and content items to users that may ultimately ignore or be annoyed by such inaccurate information, thus wasting network bandwidth and processing resources used to identify and transmit content items over a network to client devices of users that may ultimately ignore the content items.

Accordingly, as provided herein, continuity information and grouping information is used to train the model and is encoded within the model for more accurately predicting how likely users are to interact with content items. In particular, a user interaction data, such as past/historical data regarding whether users interacts with content items, user attributes of the users, and content attributes of the content items are stored within a data structure used to train a model for generating predictions as to whether users will interact with content items. The user attributes, the content attributes, and user interaction indicator values indicative of whether users interacted with certain content items are stored within fields of the data structure, such as stored within columns of a table.

In order to take into account continuity information and grouping information, sub-fields (e.g., additional columns) are created for certain attributes, such as a set of sub-fields for an age attribute and a set of sub-fields for a time attribute. Each value of an attribute is represented by a gray code comprising digits that are each stored within a field of a set of sub-fields for the attribute. For example, 7 digit gray codes are used to represent age values from 0 to 120 for an age attribute (e.g., age 16 may be represented as 1000010; age 20 may be represented by 10100000, age 21 may be represented by 10110000, etc.). So, instead of age being represented by a single age value, there are now 7 additional digits that can represent 7 different options (sub-categories) for the attribute. Each digit represents an option, and a value of the digit indicates whether an attribute value corresponds to that option. For example, a 0 value for a gray code digit may indicate that an age value of 30 does not corresponds to an option (e.g., is not within the sub-category) and a 1 value for the gray code digit may indicate that the age value of 30 does correspond to the option (e.g., is not part of the sub-category) or vice versa, and thus the age value of 30 can correspond to or not 7 options (sub-categories) for the age attribute because there are now 7 additional digits of gray code information for that age value of 30. In this way, gray code is used to represent an attribute value of an attribute using a sequences of 0s and 1s per digit of the gray code, where a digit corresponds to an option (sub-category) of the attribute, and a 0 indicates that the attribute value corresponds to the option (sub-category) and the 1 indicates that the attribute value does not correspond to the option (sub-category) or vice versa.

Each digit of the gray code may be correspond to a column, and thus 7 additional columns may be inserted into the table for the age attribute. Each column represents a particular option (sub-category) of the age attribute. In this way, categorical columns are added into the table to directly represent continuity of attribute values, and thus the categorical columns are embedded/encoded into the model (e.g., into the factorization machine during training of the model) so that the model can more accurately predict affinity scores corresponding to how likely users will interact with content items. Because consecutive numbers within the gray code may merely differ by a single digit (e.g., age 20 represented by 10100000 may differ from age 21 represented by 10110000 by merely a single digit such as the $4^{th}$ digit from the left), neighboring attribute values (e.g., ages 19 through 22) will have very similar digit values and thus belong to similar options (sub-categories). Groupings of similar attribute values and continuity of attribute values can be represented within the data structure and encoded into the model for improved predictions of how likely users are to interact with content items because of the additional considerations of grouping information and continuity information can be used by the model after training. This is because the model is now trained on behaviors that are shared among groups of attribute values and trained on behaviors that are continuous amongst multiple attribute values.

Figure 4:
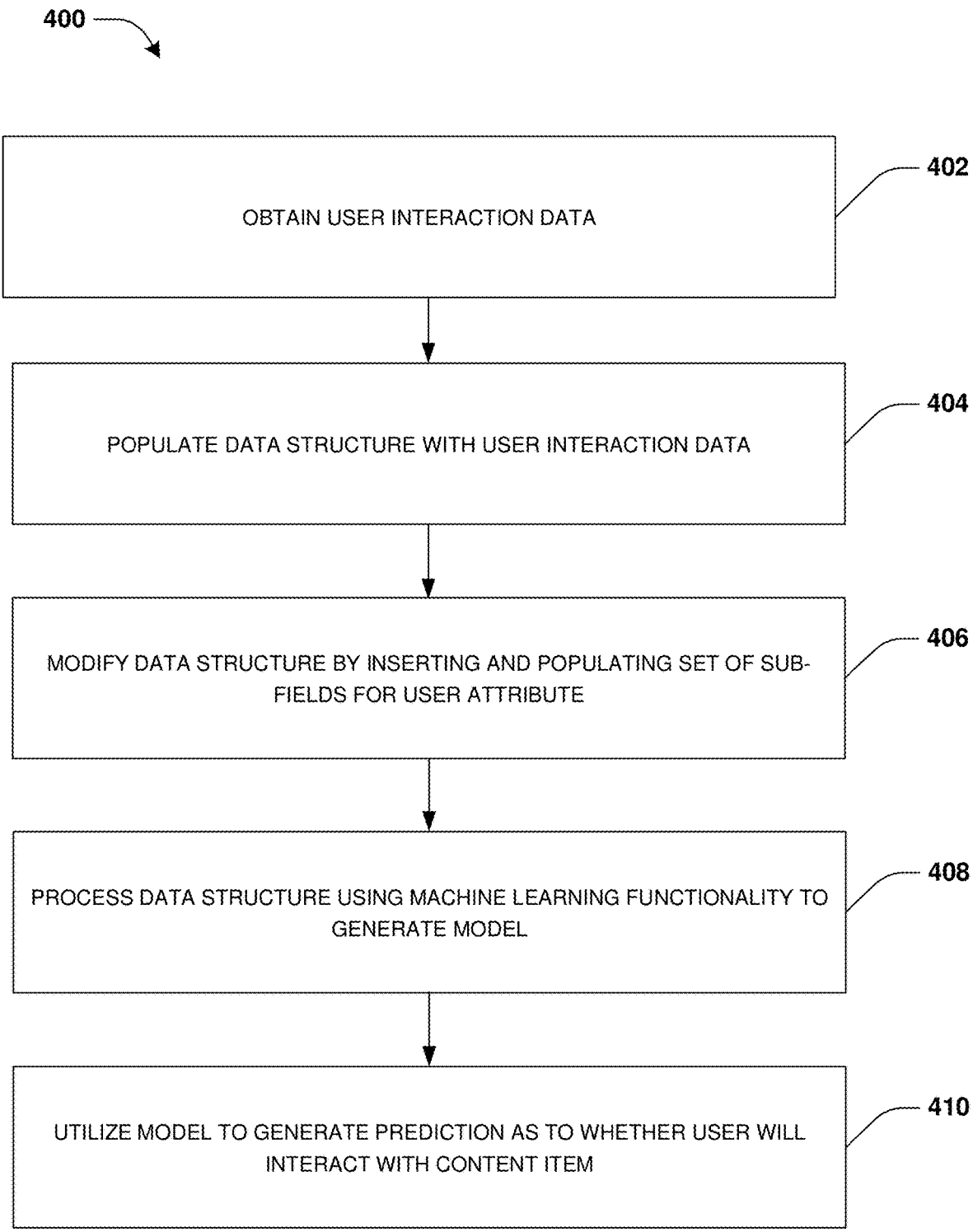
FIG. 4 is a flow chart illustrating an example method for content recommendation based upon continuity and grouping information of attributes.
Figure 5:
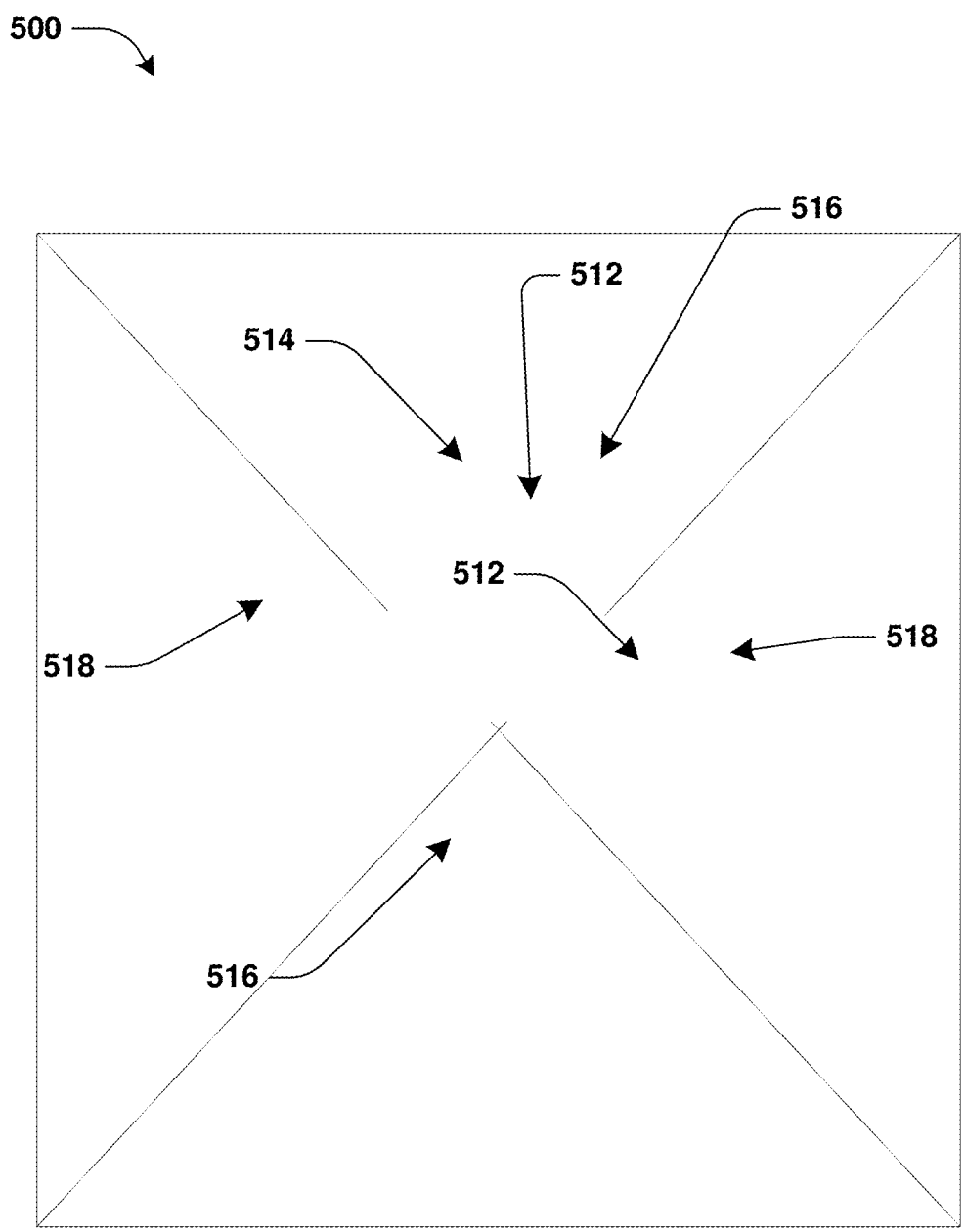
FIG. 5 is an illustration of a visual representation of a cyclic gray code.
Figure 6:
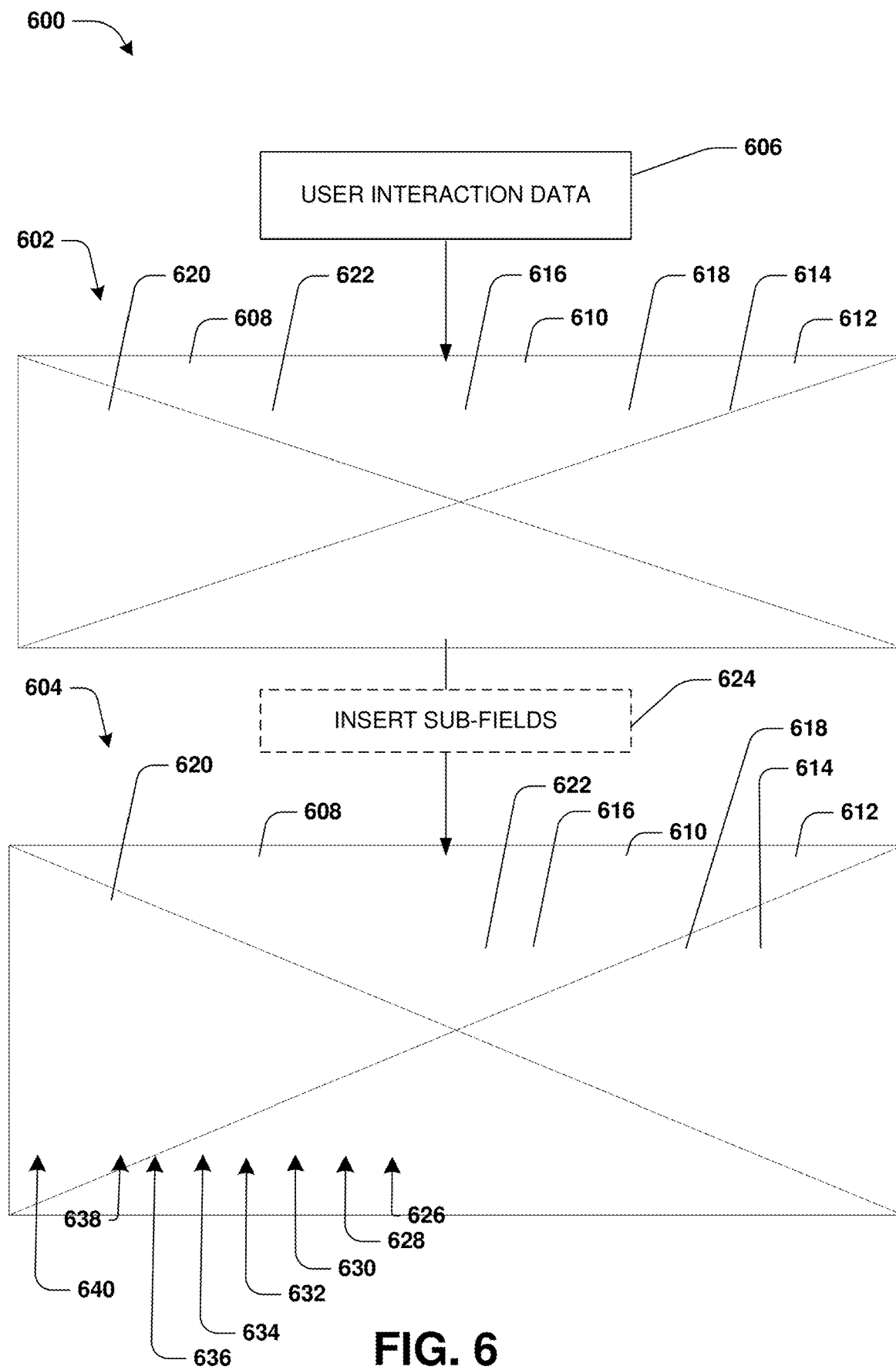
FIG. 6 is a component block diagram illustrating an example system for content recommendation based upon continuity and grouping information of attributes, where a set of sub-fields are inserted into a data structure.

An embodiment of content recommendation based upon continuity and grouping information of attributes is illustrated by an example method 400 of FIG. 4, and is described in conjunction with FIGS. 5 and 6. A content recommendation system may be implemented by hardware, software, and/or a combination thereof, such as by a server, a plurality of servers, a virtual machine, etc. Various computing devices, such as a content provider of a website, an application executing on a client device, etc., may access the content recommendation system over a computer network in order to obtain content items or recommendations of content items to provide to users, such as by displaying content items through a user interface, embedding content items into emails, displaying content items applications, websites, etc. The content recommendation system may utilize machine learning functionality and/or a model to determine what content items to provide to a requestor, such as what content item to transmit over the network to a client device for display on the client device.

In order to generate and/or train the model utilizing machine learning functionality, such as a factorization machine, user interaction data of past user interactions with content items may be used. According, user interaction data 606, of FIG. 6, specifying whether users interacted with content items is obtained, at 402. The user interaction data 606 may specify user attributes of the users and/or content attributes of the content items. The user attributes may comprise demographic information of users, locations of users (e.g., a home location, a work location, a current location, etc.), browsing history of users, interests of users (e.g., social network groups joined by users, topics of emails, messages, social network posts, forums, and/or other content/activities of the users), age, gender, etc. The content attributes may comprise information about content items, such as an identifier, a topic/category (e.g., food, travel, sports, etc.), a media type, and/or other attributes of content items.

At 404, a data structure 602 may be populated with the user interaction data 606, as illustrated by FIG. 6. User attribute values of user attribute 608 may be populated within sets of fields within the data structure 602. For example, age values of an age attribute 620 may be populated within a first set of fields (e.g., an age column within a table). Gender values of a gender attribute 622 may be populated within a second set of fields (e.g., a gender column within the table). Any number of user attributes 608 may be represented within the data structure 602. The data structure 602 may be populated with content attribute values of content attributes 610, such as within sets of fields within the data structure 602. For example, content identifier values of a content identifier attribute 616 may be populated within a third set of fields (e.g., a content identifier column within the table). Content category values of a category content attribute 618 may be populated within a fourth set of fields (e.g., a category content column within the table). User interaction indicator values 614 of user interaction indicator data 612 of whether users interacted with content items or did not (e.g., did a user click on a link to a website to purchase a service, did a user purchase the service, did the user view a suggested movie, did the user listen to a suggested song, etc.) may be populated within a fourth set of fields (e.g., an interaction column of the table).

The machine learning functionality and/or the model are natively defined to expect input of the data structure 602 having finite sets of discrete values for attributes. Thus, the model is restricted to merely making predictions based upon individuals discrete attribute values/categories without the ability to leverage continuity and grouping information such as where users from ages 20 to 22 might behave similarly or users may behave similarly at 2:00 am through 4:00 am, which would otherwise lead to more precise and accurate predictions as to whether users would interact with content items. Accordingly, as provided herein, the data structure 602 is modified and encoded with continuity information and grouping information inserted 624 as sub-fields into the data structure 602 to generate a modified data structure 604 used to train and encode the model with the continuity information and the grouping information to use when predicting whether users will interact with content items.

At 406, the data structure 602 is modified by inserting 624 the sub-fields for attributes, such as user attributes, into the data structure 602 to create the modified data structure 604. A set of sub-fields for an attribute are an encoding of continuity information and grouping information representing options (sub-categories) for the attribute, and a sub-field of the set of sub-fields for an attribute value is populated with a value corresponding an option for the attribute. The value may indicate whether a user having the attribute value (or content item for a sub-field for a content attribute) corresponds to the option (sub-category) or not (e.g., whether the user is part of a sub-category or not). The continuity information corresponds to an attribute with non-discrete values (e.g., each digit within each sub-field has a value indicating whether an attribute is part of a corresponding option (sub-category) as opposed to the attribute being represented by a single value, thus allowing for groupings of attribute values having similar correspondence to the same options/categories indicative of grouping information and continuity information) even though the machine learning functionality is configured to process discrete values instead of non-discrete values.

In an example, the set of sub-fields for an attribute are inserted into the modified data structure 604 as set of columns for the attribute. The set of sub-fields for the attribute may be populated with gray code information corresponding to the options/categories (sub-categories) for the attribute. For example, a set of columns (sub-fields) may be inserted into the modified data structure 604 for the age attribute 620, and are populated with gray code information corresponding to options/categories (sub-categories) for the age attribute 620. A column 640 may correspond to the already existing age value information, such as 20 years old for a first entry of a first female user, 21 years old for a second entry of a first male user, 16 years old for a third entry for a second male user, etc. A first column 638 may be inserted into the modified data structure 604 as a first set of fields within which a first digit of gray code information can be stored. The first digit corresponds to a first option (sub-category) for the age attribute 620. A value of the first digit, such as a 0 or 1, indicates whether an age attribute value of the age attribute corresponds to the first option (sub-category) of the age attribute, such as whether a 20 year old age attribute value corresponds to the first option, whether a 21 year old age attribute value corresponds to the first option, whether a 16 year old age attribute value corresponds to the first option, etc. For example, the 20, 21, and 16 year old age attribute values specify a value of 1 for the first digit in the first column 638, and thus the 20, 21, and 16 year old age attribute values may correspond to the first option.

A second column 636 may be inserted into the modified data structure 604 as a second set of fields within which a second digit of gray code information can be stored. The second digit corresponds to a second option (sub-category) for the age attribute 620. A value of the second digit, such as a 0 or 1, indicates whether an age attribute value of the age attribute corresponds to the second option (sub-category) of the age attribute, such as whether a 20 year old age attribute value corresponds to the second option, whether a 21 year old age attribute value corresponds to the second option, whether a 16 year old age attribute value corresponds to the second option, etc. For example, the 20, 21, and 16 year old age attribute values specify a value of 0 for the second digit in the second column 636, and thus the 20, 21, and 16 year old age attribute values may not correspond to the second option.

A third column 634 may be inserted into the modified data structure 604 as a third set of fields within which a third digit of gray code information can be stored. The third digit corresponds to a third option (sub-category) for the age attribute 620. A value of the third digit, such as a 0 or 1, indicates whether an age attribute value of the age attribute corresponds to the third option (sub-category) of the age attribute, such as whether a 20 year old age attribute value corresponds to the third option, whether a 21 year old age attribute value corresponds to the third option, whether a 16 year old age attribute value corresponds to the third option, etc. For example, the 20 and 21 year old age attribute values specify a value of 1 for the third digit within the third column 634, and thus the 20 and 21 year old age attributes may correspond to the third option. The 16 year old age attribute value specifies a value of 0 for the third digit within the third column 634, and thus the 16 year old age attribute value may not correspond to the third option.

A fourth column 632 may be inserted into the modified data structure 604 as a fourth set of fields within which a fourth digit of gray code information can be stored. The fourth digit corresponds to a fourth option (sub-category) for the age attribute 620. A value of the fourth digit, such as a 0 or 1, indicates whether an age attribute value of the age attribute corresponds to the fourth option (sub-category) of the age attribute, such as whether a 20 year old age attribute value corresponds to the fourth option, whether a 21 year old age attribute value corresponds to the fourth option, whether a 16 year old age attribute value corresponds to the fourth option, etc. For example, the 20 and 16 year old age attribute values specify a value of 0 for the fourth digit within the fourth column 632, and thus the 20 and 16 year old age attributes may not correspond to the fourth option. The 21 year old age attribute value specifies a value of 1 for the fourth digit within the fourth column 632, and thus the 21 year old age attribute value may correspond to the fourth option.

A fifth column 630 may be inserted into the modified data structure 604 as a fifth set of fields within which a fifth digit of gray code information can be stored. The fifth digit corresponds to a fifth option (sub-category) for the age attribute 620. A value of the fifth digit, such as a 0 or 1, indicates whether an age attribute value of the age attribute corresponds to the fifth option (sub-category) of the age attribute, such as whether a 20 year old age attribute value corresponds to the fifth option, whether a 21 year old age attribute value corresponds to the fifth option, whether a 16 year old age attribute value corresponds to the fifth option, etc. For example, the 20, 21, and 16 year old age attribute values specify a value of 0 for the fifth digit within the fifth column 630, and thus the 20, 21, and 16 year old age attributes may not correspond to the fifth option.

A sixth column 628 may be inserted into the modified data structure 604 as a sixth set of fields within which a sixth digit of gray code information can be stored. The sixth digit corresponds to a sixth option (sub-category) for the age attribute 620. A value of the sixth digit, such as a 0 or 1, indicates whether an age attribute value of the age attribute corresponds to the sixth option (sub-category) of the age attribute, such as whether a 20 year old age attribute value corresponds to the sixth option, whether a 21 year old age attribute value corresponds to the sixth option, whether a 16 year old age attribute value corresponds to the sixth option, etc. For example, the 20 and 21 year old age attribute values specify a value of 0 for the sixth digit within the sixth column 628, and thus the 20 and 21 year old age attributes may not correspond to the sixth option. The 16 year old age attribute value specifies a value of 1 for the sixth digit within the sixth column 628, and thus the 16 year old age attribute value may correspond to the sixth option.

A seventh column 626 may be inserted into the modified data structure 604 as a seventh set of fields within which a seventh digit of gray code information can be stored. The seventh digit corresponds to a seventh option (sub-category) for the age attribute 620. A value of the seventh digit, such as a 0 or 1, indicates whether an age attribute value of the age attribute corresponds to the seventh option (sub-category) of the age attribute, such as whether a 20 year old age attribute value corresponds to the seventh option, whether a 21 year old age attribute value corresponds to the seventh option, whether a 16 year old age attribute value corresponds to the seventh option, etc. For example, the 20, 21, and 16 year old age attribute values specify a value of 0 for the seventh digit within the seventh column 626, and thus the 20, 21, and 16 year old age attribute values may not correspond to the seventh option.

In this way, the 7 digits of gray code information can be inserted into the modified data structure 604 to encode continuity information and/or grouping information. This is because each consecutive gray code may be different by merely a single digit. For example, the gray code of 1010000 for the 20 year old age attribute value differs from the gray code of 1011000 for the 21 year old age attribute value by merely the fourth digit. Thus, the 20 year old age attribute value and the 21 year old age attribute value share the first, second, third, fifth, sixth, and seventh option (sub-category), and may be grouped together in order to consider continuity of those options (sub-categories) shared between the otherwise two discrete age attribute values of 20 and 21. When the model is trained using the modified data structure 604, the model is encoded to take into account this continuity and grouping information indicating that certain age attribute values, such as 20 and 21, may exhibit similar user behavior of the first, second, third, fifth, sixth, and seventh options (sub-categories) in common between them.

In an embodiment, the continuity information and the grouping information may be encoded utilizing a monotonic gray code, where each consecutive gray code value differs in only 1 digit and the last gray code value can be radically different than the first gray code value. In an embodiment, the continuity information and the grouping information may be encoded utilizing a cyclic gray code. For example, a cycle gray code of 3 digits may be where a first attribute value of an attribute is assign a first gray code of 000, a second attribute value of the attribute is assigned a second gray code of 001, a third attribute value of the attribute is assigned a third gray code of 011, a fourth attribute value of the attribute is assigned a fourth gray code of 010, a fifth attribute value of the attribute is assigned a fifth gray code value of 111, a sixth attribute value of the attribute is assigned a sixth gray code value of 101, and a seventh attribute value of the attribute is assigned a seventh gray code value of 100. This gray code information is cyclic because each consecutive gray code value differs in only 1 digit, and the last gray code value 100 only differ from the first gray code value 000 by a single digit.

FIG. 5 illustrates an example of a visual representation of a cyclic gray code 500 that may be utilized to encode continuity information and grouping information into a model used to predict likelihoods of users interacting with content items. The visual representation of the cyclic gray code 500 represents 16 different gray codes that can be used to represent 16 different options (sub-categories) for an attribute, such as a user attribute, a content attribute, a numerical attribute, etc. A first gray code 0000 is assigned to a first attribute value of the attribute (e.g., an age attribute value of 1 years old). A second gray code 0001 is assigned to a second attribute value of the attribute (e.g., an age attribute value of 2 years old). A third gray code 0011 is assigned to a third attribute value of the attribute (e.g., an age attribute value of 3 years old). A fourth gray code 0011 is assigned to a fourth attribute value of the attribute (e.g., an age attribute value of 4 years old). A fifth gray code 0110 is assigned to a fifth attribute value of the attribute (e.g., an age attribute value of 5 years old). In this way, 16 different gray codes can be assigned to 16 attribute values of the attribute.

Each gray code has 4 digits. Each digit of a gray code may correspond to an option (sub-category) of the attribute (e.g., sub-categories of an age attribute). A value of a digit may indicate whether an attribute value represented by the gray code corresponds to the option (sub-category) or not. In this way, an attribute value can be encoded with continuity information and grouping information relating to 4 different options (sub-categories) that can be used to group related attribute values (e.g., because the first gray code of 0000 and the second gray code of 0001 differ only by 1 digit, the first attribute value and the second attribute value may be similar with respect to 3 of the 4 options, and thus can be grouped together as being similar). Related attribute values can be grouped to convey continuity information (e.g., 1 year olds and 2 year olds may behave similarly, and thus the continuity of age from and between being 1 years old and 2 years old can be encoded into the model).

The first digit of each gray code in visual representation of the cyclic gray code 500 corresponds to an inner circle 512, where white boxes represent 0 and black boxes represent 1 for the first digit. The second digit of each gray code in the visual representation of the cyclic gray code 500 corresponds to a circle 514. The third digit of each gray code in the visual representation of the cyclic gray code 500 corresponds to a circle 516. The fourth digit of each gray code in the visual representation of the cyclic gray code 500 corresponds to an outer circle 518.

Once the modified data structure 604 is created, the modified data structure 604 is processed using machine learning functionality to generate the model, at 408. Because the additional sub-fields of gray code information are inserted into the modified data structure 604, the model is trained and encoded with continuity information (e.g., instead of separately understanding and considering discrete time values, the model can understand a continuous flow of time where a time period can correspond to similar user behavior, such as where users behave similarly from 1:00 am to 4:00 am, which can be understand by the model because gray codes for those time attribute values of 1:00 am to 4:00 am may correspond to similar options/sub-categories of a time attribute) and grouping information (e.g., users that are 20 years old to 24 years old may behave similarly, which can be understood by the model because gray codes for those age attribute values of 20 to 24 may correspond to similar options/sub-categories of an age attribute) in order to improve the ability of the model to predict likelihoods of whether users will interact with content. In this way, the model is trained on data populated within the modified data structure 604.

After the model is generated and trained, the model may be utilized for selectively identifying and/or providing content items to users, such as for display through a user interface, an audio message played by a computing device, an image populated within a webpage, an email message, a text message, a push notification, etc. In an example, a first computing device configured to host a website may determine that a client computing device is requesting a webpage of the website. The first computing device may transmit a request over a network to a second computing device hosting the content recommendation system. The content recommendation system may identify user attributes of a user associated within the client computing device (e.g., the user attributes may be provided by the first computing device or may be maintained by the second computing device).

The content recommendation system utilizes the user attributes of the user and content attributes of available content items to provide to the user as input to the model. The model generations predictions, such as scores, so to how likely the user is to interact with each content item. In this way, the model ranks the content items based upon how likely the user is to interact with each content item. A content item have a particular rank (e.g., a rank above a threshold, a highest rank, etc.) may be transmitted by the content recommendation system from the second computing device to the first computing device over a network. In this way, the content item can be populated and displayed through the webpage. In another example, the content item may be directly provided to the client computing device.

Figure 7:
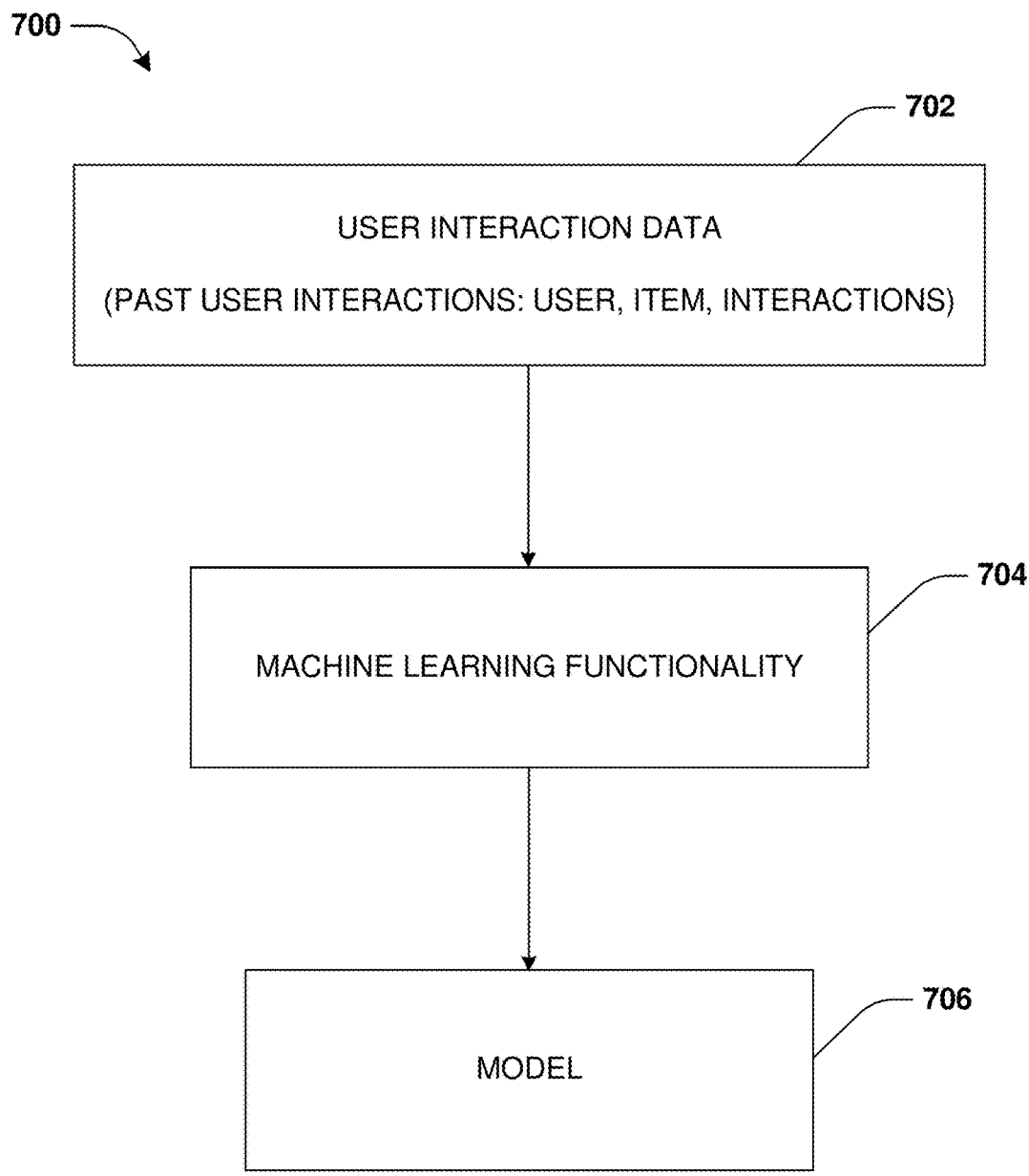
FIG. 7 is a component block diagram illustrating an example system for content recommendation based upon continuity and grouping information of attributes, where a model is generated.

FIG. 7 illustrates an example of a system 700 for training a model 706 to output predictions of how likely users are to interact with content items. Machine learning functionality 704, such as a factorization machine, may be configured to train the model 706 using user interaction data 702 corresponding to historic/past user interactions with content items. Generally, the machine learning functionality 704 may understand and expect the user interaction data 702 to specify attributes as finite sets of discrete values, and thus the machine learning functionality 704 is unable to train the model 706 to account for continuity of attribute values (e.g., the model 706 can only evaluate and take into account a single attribute value in isolation, such as a single hour as opposed to the concept of time being continuous as opposed to 24 individual isolated hours) and grouping of similar attributes (e.g., users with similar ages, such as users between 50 and 53 years old, may behave similarly).

Accordingly, as provided herein, the user interaction data 702 is encoded with continuity information and grouping information by assigning gray code values for each attribute value of an attribute (e.g., a gray code value of 000 may be assigned to 12:00 am, a gray code value of 001 may be assigned to 1:00 am, etc.). Each digit of a gray code value can correspond to an option (sub-category) of the attribute. In this way, additional information (e.g., whether an attribute value corresponds to an option or not) can be encoded into the user interaction data for training the model 706 to take into account continuity information and grouping information. Accordingly, the machine learning functionality 704 trains the model 706 based upon the user interaction action data 702 that is augmented with gray code information, such as cyclic gray code values or monotonic gray code values.

Figure 8:
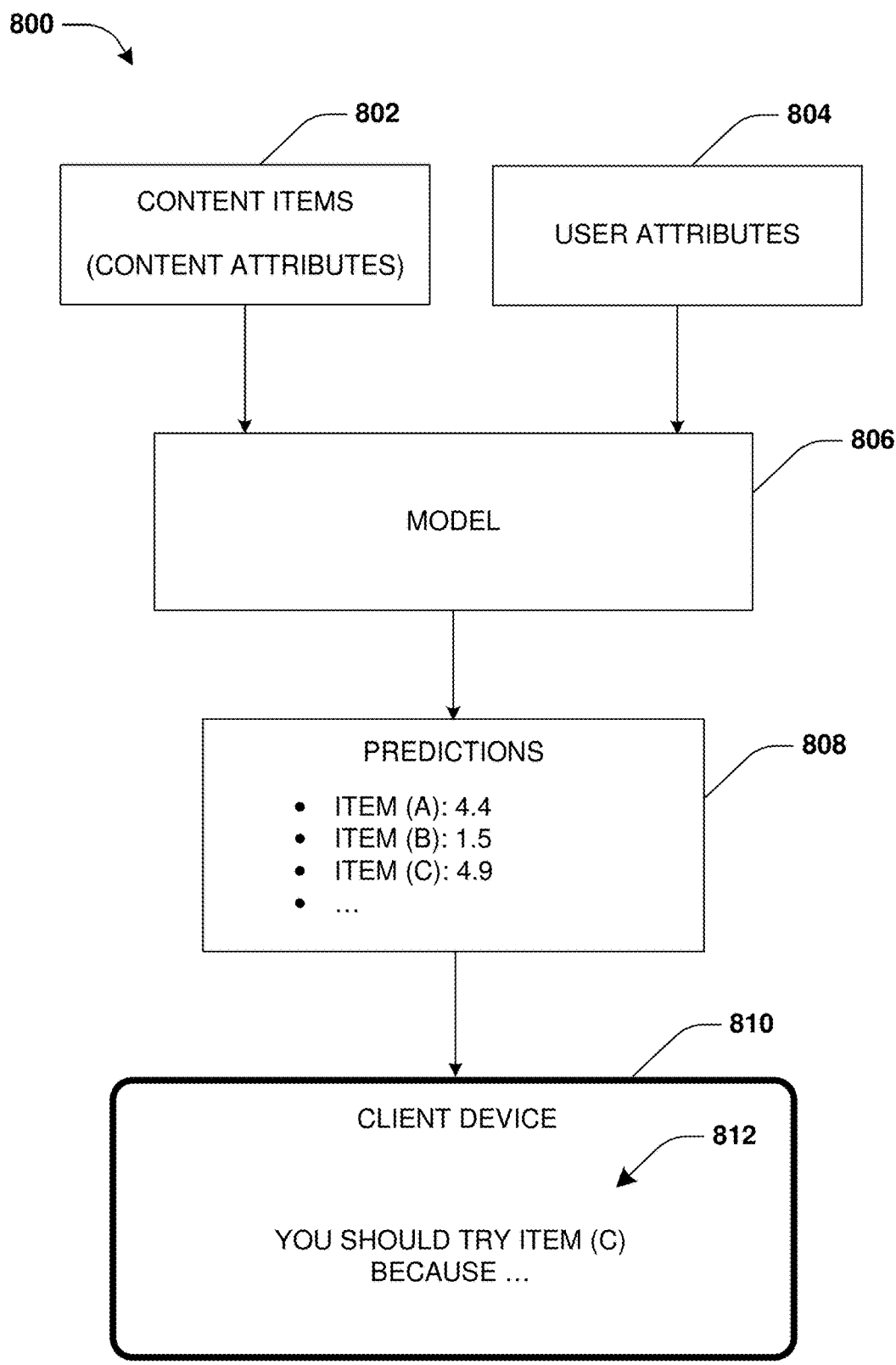
FIG. 8 is a component block diagram illustrating an example system for content recommendation based upon continuity and grouping information of attributes, where a model is used to generate predictions as to whether a user will interact with content items.

FIG. 8 illustrates an example of a system 800 for providing content items that are selected utilizing a model 806 trained on continuity information and grouping information derived from gray codes assigned to attribute values of user interaction data used to train the model 806. The model 806 may be maintained by a computing device that hosts a content recommendation system. The content recommendation system may receive a request or indication of an opportunity to provide a user of a client device 810 with a content item. Content attributes of content items 802 and user attributes 804 of the user are input into the model 806. The model 806 evaluates the content attributes and the user attributes 804 to generate predictions 808 of how likely the user is to interact with each of the content items 802 (e.g., a prediction may comprise a value, such as from 0 to 5, of how likely the user will interact with a content item). The content recommendation system may transmit a content item 812, such as a recommendation to try item C having a highest prediction, to the client device 810 for display to the user.

Figure 9:
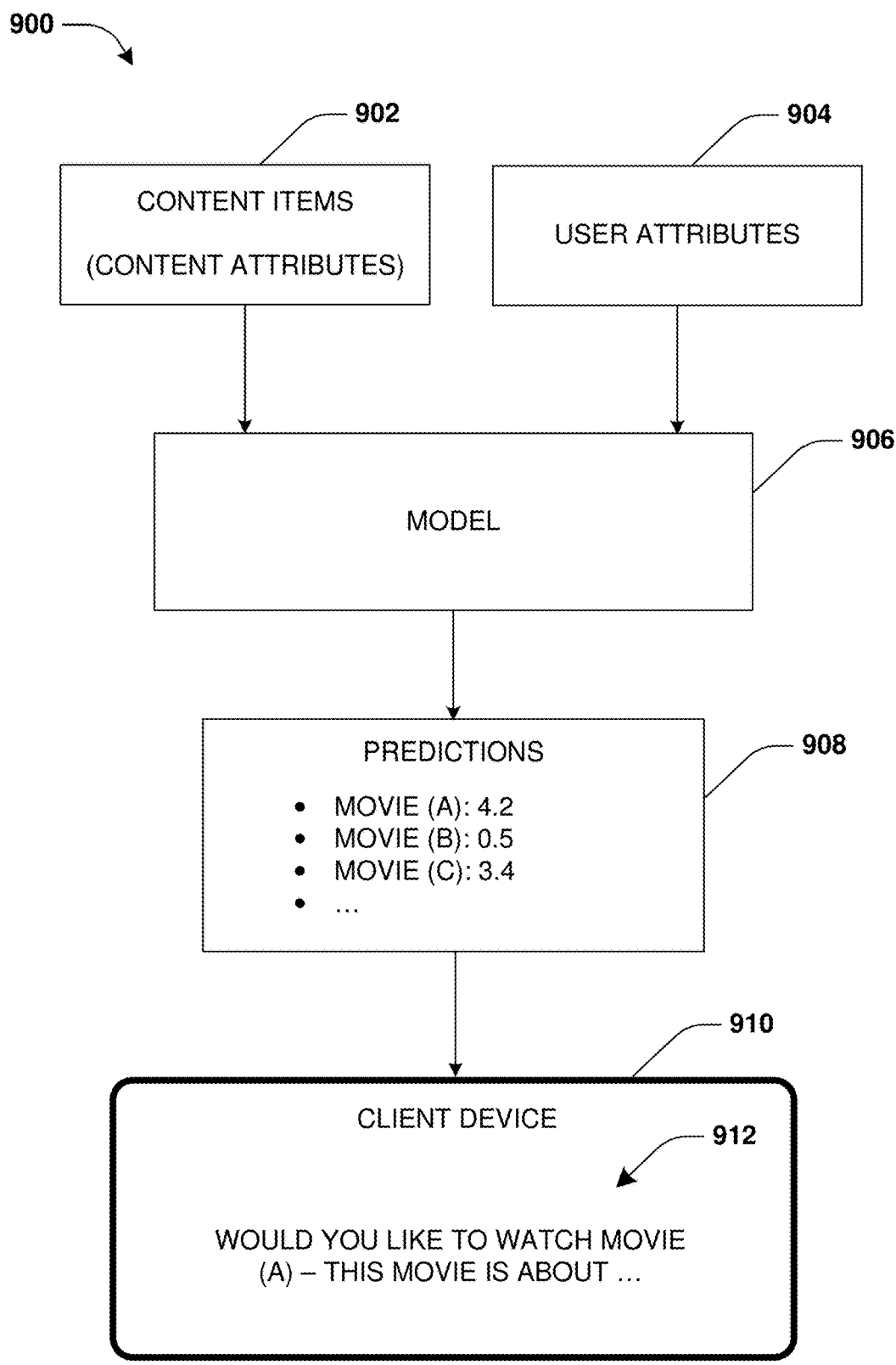
FIG. 9 is a component block diagram illustrating an example system for content recommendation based upon continuity and grouping information of attributes, where a model is used to generate predictions as to whether a user will interact with content items.

FIG. 9 illustrates an example of a system 900 for providing content items that are selected utilizing a model 906 trained on continuity information and grouping information derived from gray codes assigned to attribute values of user interaction data used to train the model 906. The model 906 may be maintained by a computing device that hosts a movie streaming service. The content recommendation system may determine that a client device 910 has accessed the movie streaming service, such as where a user launches an application configured to play movies from the movie streaming service. Content attributes of content items 902 (e.g., attributes of movies available from the movie streaming service, such as length, topic, release date, etc.) and user attributes 904 of the user are input into the model 906. The model 906 evaluates the content attributes and the user attributes 904 to generate predictions 908 of how likely the user is to watch each movie (e.g., a prediction may comprise a value, such as from 0 to 5, of how likely the user will watch a movie). The content recommendation system may transmit a recommendation 912 of a particular movie (e.g., movie A with a highest prediction) to the client device 910 for display to the user.

Figure 10:
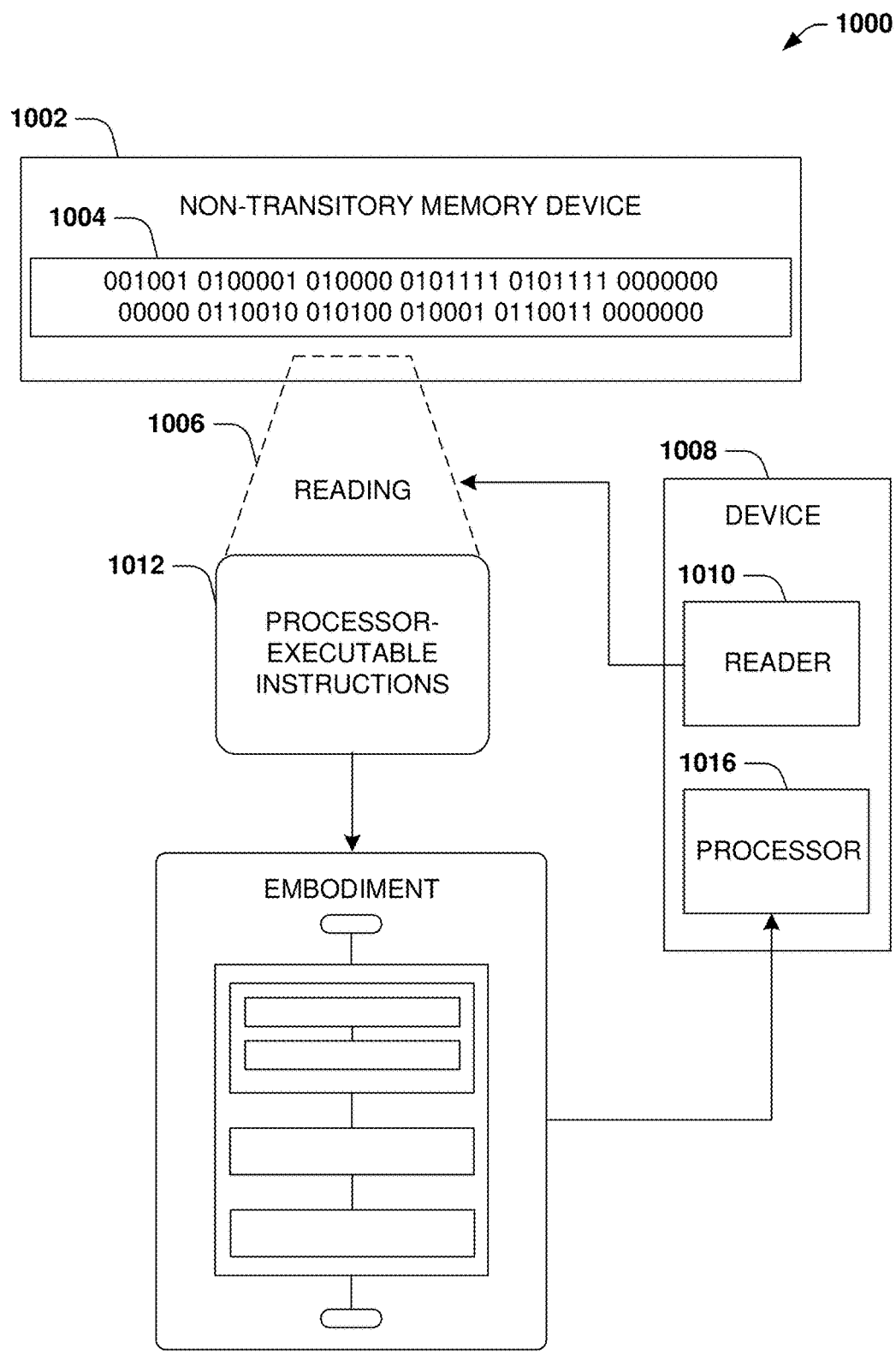
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein. The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 400 of FIG. 4, for example. In some embodiments, the processor-executable instructions 1012 are configured to cause implementation of a system, such as at least some of the example system 600 of FIG. 6, at least some of the example system 700 of FIG. 7, at least some of the example system 800 of FIG. 8, and/or at least some of the example system 900 of FIG. 9, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
executing, on a processor of a computing device, instructions that cause the computing device to perform operations, the operations comprising:
modifying a data structure by inserting a plurality of sub-fields for a single user attribute associated with a plurality of possible attribute values, wherein the plurality of sub-fields represent a single attribute value of the single user attribute in a distributed encoded form; and
at least one of generating or training a model utilizing the data structure.

2. The method of claim 1, comprising:
populating the plurality of sub-fields with gray code information corresponding to options for the user attribute.

3. The method of claim 1, wherein the data structure comprises a table and user attribute values of the user attribute are populated within a first set of fields within a first column of the table.

4. The method of claim 3, wherein content attribute values of a content attribute are populated within a second set of fields within a second column of the table.

5. The method of claim 4, wherein user interaction indicator values are populated within a third set of fields within a third column of the table.

6. The method of claim 3, wherein the plurality of sub-fields correspond to a set of columns inserted into the table for the user attribute.

7. The method of claim 1, comprising:
utilizing the data structure to rank two or more content items based upon a likelihood a user will interact with the two or more content items.

8. The method of claim 7, comprising:
transmitting a content item, having a rank above a threshold, over a network to a computer for display to the user.

9. The method of claim 1, comprising:
populating the plurality of sub-fields with cyclic gray code information corresponding to options for the user attribute.

10. The method of claim 1, comprising:
populating the plurality of sub-fields with monotonic gray code information corresponding to options for the user attribute.

11. The method of claim 1, comprising:
populating the plurality of sub-fields with gray code values corresponding to options for the user attribute, wherein consecutive gray code values differ by a single digit.

12. The method of claim 1, wherein the model is at least one of generated or trained utilizing a factorization machine.

13. A computing device comprising:
a processor; and
memory comprising processor-executable instructions that when executed by the processor cause performance of operations, the operations comprising:
modifying a data structure by inserting a plurality of sub-fields for a single user attribute associated with a plurality of possible attribute values, wherein the plurality of sub-fields represent a single attribute value of the single user attribute in a distributed encoded form; and
at least one of generating or training a model utilizing the data structure.

14. The computing device of claim 13, wherein the operations comprise:
populating the plurality of sub-fields with gray code information corresponding to options for the user attribute.

15. The computing device of claim 13, wherein the data structure comprises a table and user attribute values of the user attribute are populated within a first set of fields within a first column of the table.

16. The computing device of claim 15, wherein content attribute values of a content attribute are populated within a second set of fields within a second column of the table, and wherein.

17. The computing device of claim 15, wherein user interaction indicator values are populated within a second set of fields within a second column of the table.

18. The computing device of claim 15, wherein the plurality of sub-fields correspond to a set of columns inserted into the table for the user attribute.

19. A non-transitory machine readable medium having stored thereon processor-executable instructions that when executed cause performance of operations, the operations comprising:
modifying a data structure by inserting a plurality of sub-fields for a single attribute associated with a plurality of possible attribute values, wherein the plurality of sub-fields represent a single attribute value of the single attribute in a distributed encoded form; and
at least one of generating or training a model utilizing the data structure.

20. The non-transitory machine readable medium of claim 19, wherein the operations comprise:
utilizing the data structure to rank two or more content items based upon a likelihood a user will interact with the two or more content items; and
transmitting a content item, having a rank above a threshold, over a network to a computer for display to the user.

* * * * *